United States Patent
Xie et al.

(10) Patent No.: US 6,512,836 B1
(45) Date of Patent: Jan. 28, 2003

(54) SYSTEMS AND METHODS FOR ETCHING DIGITAL WATERMARKS

(75) Inventors: Liehua Xie, Herndon, VA (US); Arianne Michelle Lewis, Chestnut Hill, MA (US); Evert Basch, Stow, MA (US); Gonzalo Arce, Wilmington, DE (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/627,748

(22) Filed: Jul. 28, 2000

(51) Int. Cl.[7] .................................. G06K 9/00
(52) U.S. Cl. ..................... 382/100; 713/176; 713/179
(58) Field of Search ................... 382/100, 232; 380/210, 252, 287, 54; 713/176, 179; 348/461, 463

(56) References Cited

U.S. PATENT DOCUMENTS

| | | | | |
|---|---|---|---|---|
| 5,809,139 A | * | 9/1998 | Girod et al. ................. | 380/202 |
| 6,104,826 A | * | 8/2000 | Nakagawa et al. ......... | 382/100 |
| 6,154,571 A | * | 11/2000 | Cox et al. ................... | 382/250 |
| 9,192,139 | * | 2/2001 | Tao ............................. | 382/100 |
| 6,208,735 B1 | * | 3/2001 | Cox et al. .................... | 380/54 |
| 6,278,792 B1 | * | 8/2001 | Cox et al. ................... | 382/100 |
| 6,285,775 B1 | * | 9/2001 | Wu et al. .................... | 382/100 |

OTHER PUBLICATIONS

Adaptive Watermarking In The DCT Domain; Bo Tao et al; IEEE International conference on Acoustics, Speech and Signal Processing; Apr. 21–24, 1997.*

Secure MPEG Video Communication By Watermarking; Liehua Xie et al.; The Proc. Conf. Of ATIRP (Advanced Telecommunication & Information), MD, Feb., 1999; pp. 459–463.

A Blind Content Based Digital Image Signature; Liehua Xie et al.; The Proc. Conf. Of ATIRP (Advanced Telecommunication & Information), MD, Jan., 1998.

Methods for Soft Image/Video Authentication; Liehua Xie et al.; The Proc. Conf. Of ATIRP (Advanced Telecommunication & Information), MD, Mar., 2000.

* cited by examiner

Primary Examiner—Leo Boudreau
Assistant Examiner—Abofazl Tabatabai
(74) Attorney, Agent, or Firm—Leonard Charles Suchyta; James K. Weixel

(57) ABSTRACT

A system (100) for watermarking digital data includes a watermark etching subsystem (105) and a watermark extraction subsystem (110). The watermark etching subsystem (105) obtains a matrix of digital data values, selects windows including a plurality of data values from the matrix, specifies a parameter that indicates an acceptable amount of variation in the data values, and etches watermark bits in each window of data values using the specified parameter. The watermark extraction subsystem (110) obtains a matrix of digital data values containing an etched watermark, selects windows comprising a plurality of data values from the matrix, and extracts watermark bits from each window of data values using the specified parameter.

61 Claims, 9 Drawing Sheets

SYSTEMS AND METHODS FOR ETCHING DIGITAL WATERMARKS

STATEMENT REGARDING FEDERALLY SPONSORED RESEARCH FOR DEVELOPMENT

This invention was made with Government support under Contract No. DAAL-01-96-2-0002, awarded by the United States Army. The Government has certain rights in this invention.

FIELD OF THE INVENTION

The present invention relates generally to systems and methods for etching digital watermarks and, more particularly, to systems and methods for etching digital watermarks with improved error tolerances.

BACKGROUND OF THE INVENTION

The secure transmission of multimedia information is an important concern for multimedia service providers and multimedia content owners. Secure conditional access has conventionally been accomplished through the use of encryption. However, for widespread distribution of multimedia, conventional key-management mechanisms used in encryption techniques are often too cumbersome. In addition, encryption techniques do not address the issue of copyright protection. Once encrypted material has been decoded, the reproduction, manipulation, and redistribution of data streams can be almost effortless, especially since information transmitted in packet networks is in a digital format.

More recently, attention has been focused on supplementing encryption with digital watermarking to provide copyright protection and tamper-proofing for multimedia streams. Digital watermarking is a technique that hides information, or a message authentication code (MAC), in the audio, image, or video stream. Watermarking has advantages over traditional MAC systems in that watermarks are embedded directly into the multimedia information (e.g., into the coefficients of the image or video signal or into the tones of the audio signal). A traditional digital MAC can be removed easily because it is attached to the document and jointly transmitted or stored.

In addition, conventional cryptographic techniques can be inadequate if the communication channel is lossy. A single bit error can cause the received signal to fail authentication when conventional MACs are used. If a robust MAC scheme such as watermarking is used, minor distortions will be ignored so that decisions based on the watermark can be made more intelligently and can more accurately reflect the state of the content that the watermark is protecting.

A considerable amount of research has been performed to investigate robust watermarks that identify the owner and/or the purchaser of the audio track or image in question. The primary requirement for copyright protection watermarks is that they be survivable to compression and common signal distortions, thus, making it impossible to remove the watermark without destroying the value of the multimedia content that it protects.

In addition to copyright applications, watermarking can also be used to authenticate and tamper-proof multimedia content. For a video authentication application, a watermark must be robust to compression, common signal distortions, and the effects of error-prone channels, but it must further indicate any modification made to the stream. Therefore, the watermark should describe the content and the salient features of the video information. For example, video authentication MACs can conventionally be constructed from edge maps of video frames or from an image histogram of video frames.

Digital watermarks are added to compressed video (e.g., MPEG video) by modifying the encoded video information. If a watermark is meant to be extracted without the use of the original, as is the case in authentication applications, the etching process must use some video coefficients as a reference.

One conventional method embeds a watermark by sliding a non-overlapping 3×1 window over DC coefficients from luminance (Y) blocks in intraframes (I-frames). The coefficients contained in the window may be denoted $b_1$, $b_2$, and $b_3$ to represent the coefficient values at the (i−1)th, (i)th and (i+1)th position of the DC sequence. The corresponding rank-ordered coefficients are denoted as $b(1) \leq b(2) \leq b(3)$. The median coefficient is then modified depending on the values of $b(1)$, $b(3)$, and the watermark bit x to be etched. The interval between $b(1)$ and $b(3)$ is divided into levels 1_0, 1_1, ..., 1_m where $b(1)$ is defined to be at level zero 1_0 and $b(3)$ is defined to be at level m 1_m. $b(2)$ lies at an arbitrary level 1_k between $b(1)$ and $b(3)$. If k is even and x=0, $b(2)$ remains unchanged, but if x=1, then $b(2)$ is increased (decreased) by one level making it fall on an odd level. Likewise, if k is odd and x=1, $b(2)$ remains unchanged, but if x=0, then $b(2)$ is increased (decreased) by one level making it fall on an even level. This transformation forces the coefficient $b(2)$ to fall on an even level if x=0 and on an odd level if x=1. The coefficients $b(1)$ and $b(3)$ remain unchanged so that the original image is not needed during the extraction process.

Another conventional method uses an approach similar to that just described, except it uses only the first coefficient of each I-frame macro-block as a reference. The first coefficient is defined at level zero, and a watermark bit is etched into the second coefficient depending on whether the second coefficient lies on an even or odd level relative to the first coefficient. The same rules used above to determine if the median coefficient should be modified are applied to the second coefficient. The method then continues for the third coefficient using the second as the new reference, and then for the fourth coefficient using the third as the new reference, and so on.

One of the main difficulties in constructing a watermarking system for copyright protection or authentication applications is its survivability to acceptable signal distortions. For a copyright protection application, the list of acceptable video distortions is quite extensive because the content owner is interested in claiming ownership regardless of the manipulation done to the original content. For example, watermarking for copyright protection may need to be robust to cropping, rotating, dithering, recompression, and the like. The acceptable distortions for the authentication application are more limited because the authentication MAC must still be able to identify tampering. Distortions caused by recompression or by minor channel errors do not indicate tampering, while cropping and rotating do. During recompression, the essence of the video information is maintained, but minor fluctuations in individual coefficient values, though not perceptible, can change the value of the MAC. Robustness to distortion can be built into the watermark etching algorithm or into the MAC itself.

Therefore, there exists a need for a system and method that improves the survivability of an etched watermark to signal distortions induced in multimedia data.

SUMMARY OF THE INVENTION

Systems and methods consistent with the present invention address this need by improving the error tolerance of watermark etching algorithms. The present invention builds in an error tolerance buffer when watermark bits are etched into digital data. Using systems and methods consistent with the present invention, minor modifications (e.g., distortions) to digital data values that fall within a specified error tolerance range will not cause an error in the watermark extraction process. Modifications to digital data values above the specified error tolerance range (whether due to excessive recompression or to actual tampering) may alter the extracted watermark bits at the receiver and may indicate tampering.

In accordance with the purpose of the invention as embodied and broadly described herein, a method of watermarking digital data includes obtaining a matrix of digital data values; selecting a plurality of data values from the matrix; specifying a parameter that indicates an acceptable amount of variation in the data values; and etching watermark bits in at least two of the plurality of data values using the specified parameter.

In another implementation consistent with the present invention, a method of extracting a watermark from digital data includes obtaining a matrix of digital data values containing an etched watermark; selecting a plurality of data values from the matrix; specifying a parameter that indicates an acceptable amount of variation in the data values; and extracting watermark bits from at least two of the plurality of data values using the specified parameter.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide mechanisms that improve the error tolerance of watermark etching algorithms. The present invention builds in an error tolerance buffer when watermark bits are etched into digital data. Thus, using systems and methods consistent with the present invention, minor modifications (e.g., distortions) to digital data values that fall within a specified error tolerance range will not cause errors in the watermark extraction process.

Exemplary Watermarking System

Figure 1:
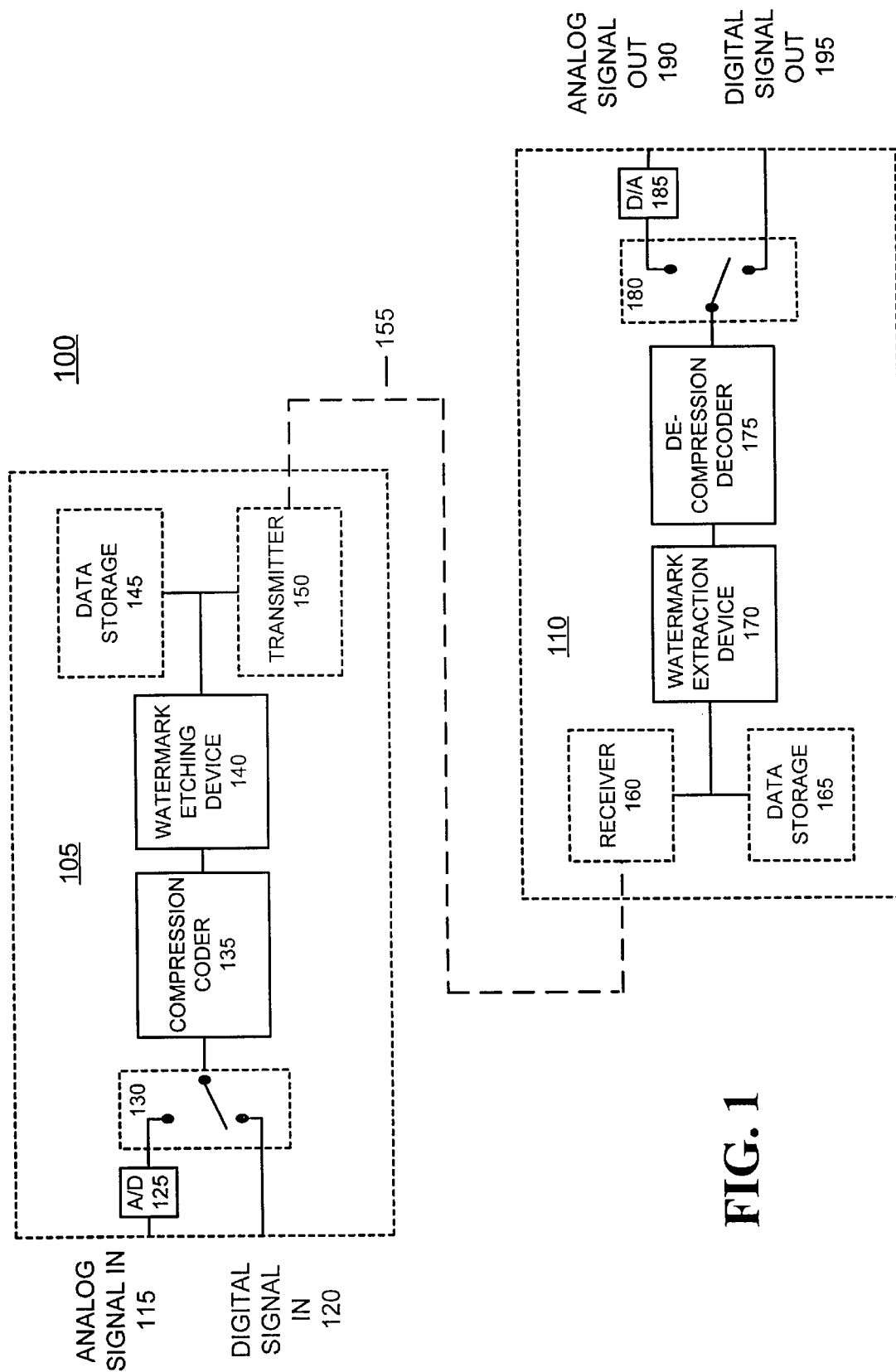
FIG. 1 illustrates an exemplary system consistent with the present invention.

FIG. 1 illustrates an exemplary system 100, consistent with the present invention, for etching and extracting watermarks from digital data. System 100 may include a watermark etching subsystem 105 and a watermark extraction subsystem 110. Watermark etching subsystem 105 can include an analog signal input 115, a digital signal input 120, an analog-to-digital (A/D) converter 125, a switch 130, a compression coder 135, a watermark etching device 140, an optional data storage device 145, and an optional transmitter 150.

Analog signal input 115 connects to compression coder 135 through A/D converter 125 and switch 130. A/D converter 125 includes conventional circuitry for converting analog input signals to digital signal form. Digital signal input 120 connects to compression coder 135 through switch 130. Compression coder 135 can include any known digital compression coder such as, for example, a conventional MPEG compression coder for coding video data. Watermark etching device 140 receives compressed digital data from compression coder 135. Watermark etching device 140 etches digital watermarks into the data received from compression coder 135 in accordance with the present invention.

Data storage device 145 may include conventional devices for storing and retrieving digital data, including floppy diskette drives, CD ROM drives, DVD drives or the like. Transmitter 150 may receive data containing etched digital watermarks from watermark etching device 140. Transmitter 150 may include transmitter circuitry well known to one skilled in the art for transmitting the received data over link 155. Link 155 may include one or more wireless, wire-line or optical links.

Watermark extraction subsystem 110 can include an optional receiver 160, an optional data storage device 165, a watermark extraction device 170, a decompression decoder 175, a switch 180, a digital-to-analog (D/A) converter 185, an analog signal output 190, and a digital signal output 195.

Data storage device 165 may include conventional devices for storing and retrieving digital data, including floppy diskette drives, CD ROM drives, DVD drives or the like. Receiver 160 may include receiver circuitry well known to one skilled in the art for receiving data transmitted over link 150. Watermark extraction device 170 receives data containing etched digital watermarks from data storage device 165 or receiver 160. Watermark extraction device 170 extracts, in accordance with the present invention, digital watermarks from the digital data received from receiver 160.

Decompression decoder 175 receives, and decompresses, video data from watermark extraction device 170. Decompression decoder 175 can include any known digital decompression decoder such as, for example, a conventional MPEG video decompression decoder. Decompression decoder 175 provides decompressed video to analog signal output 190 via switch 180 and digital-to-analog converter 185. D/A converter 185 includes conventional circuitry for converting signals from digital to analog signal form. Decompression decoder 175 provides decompressed video to digital signal output 195 via switch 180.

Exemplary Watermark Etching/Extraction Device

Figure 2:
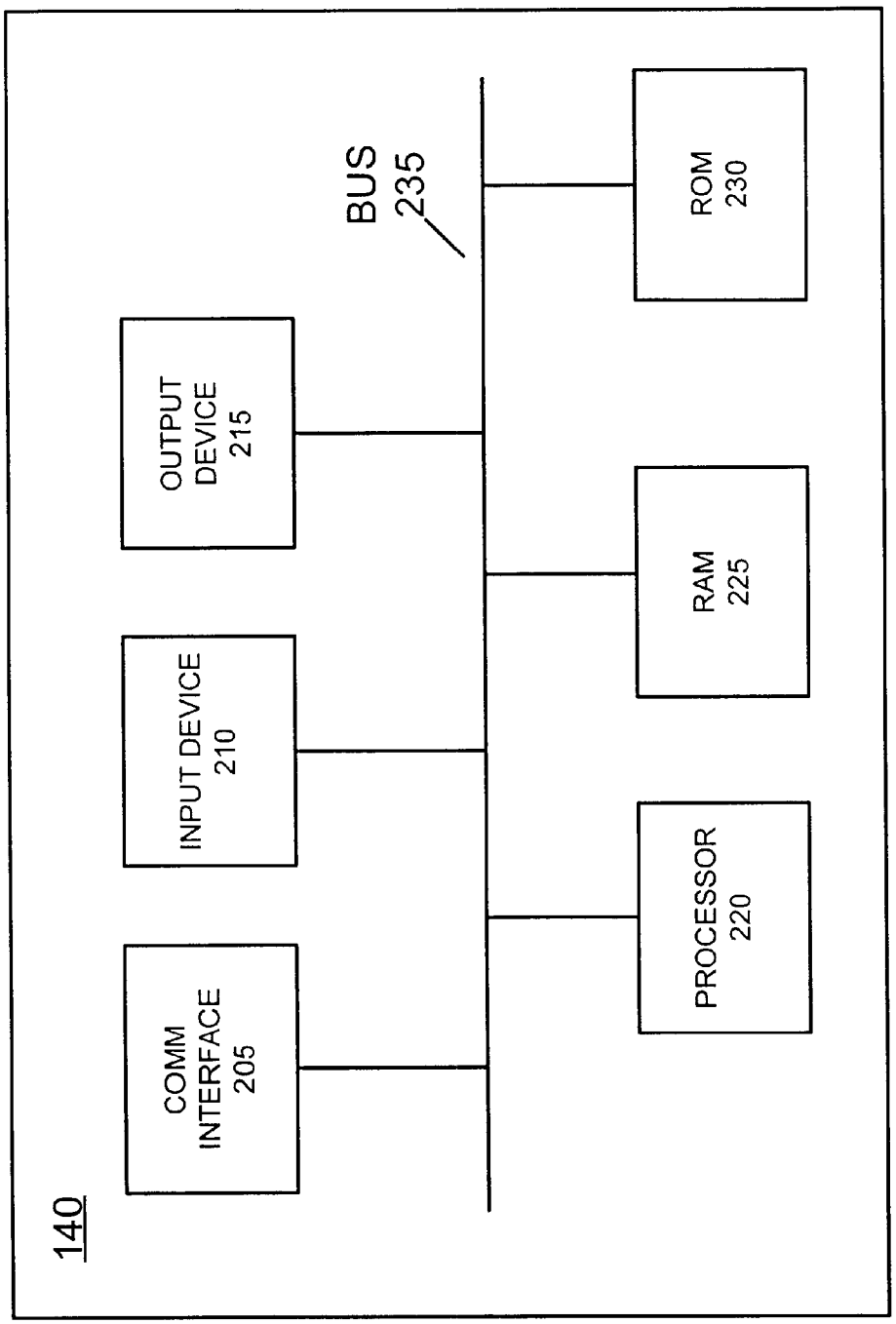
FIG. 2 illustrates exemplary components of a watermark etching/extraction device consistent with the present invention.

FIG. 2 illustrates an exemplary watermark etching device 140, consistent with the present invention. Watermark extraction device 170 may be configured similarly. Watermark etching device 140 may include a communication interface 205, an input device 210, an output device 215, a processor 220, a Random Access Memory (RAM) 225, a Read Only Memory (ROM) 230, and a bus 235.

Communication interface 205 includes conventional mechanisms for connecting device 140 to devices, such as compression coder 135, data storage device 145, and transmitter 150. Input device 210 permits entry of data into device 140 and can include one or more user interfaces (not shown), such as a keyboard, a mouse or the like. Output device 215 permits the output of data in video, audio, or hard copy format.

Processor 220 may perform all data processing functions for inputting, outputting, and watermarking of video data. RAM 225 provides semi-permanent working storage of data and instructions for use by processor 220. ROM 230 provides permanent or semi-permanent storage of data and instructions for use by processor 220. RAM 225 and ROM 230 may include large-capacity storage devices, such as a magnetic and/or optical recording medium and its corresponding drive. Bus 235 interconnects the various components of device 140 to permit the components to communicate with one another.

Exemplary Watermark Etching Processing

Figure 3:
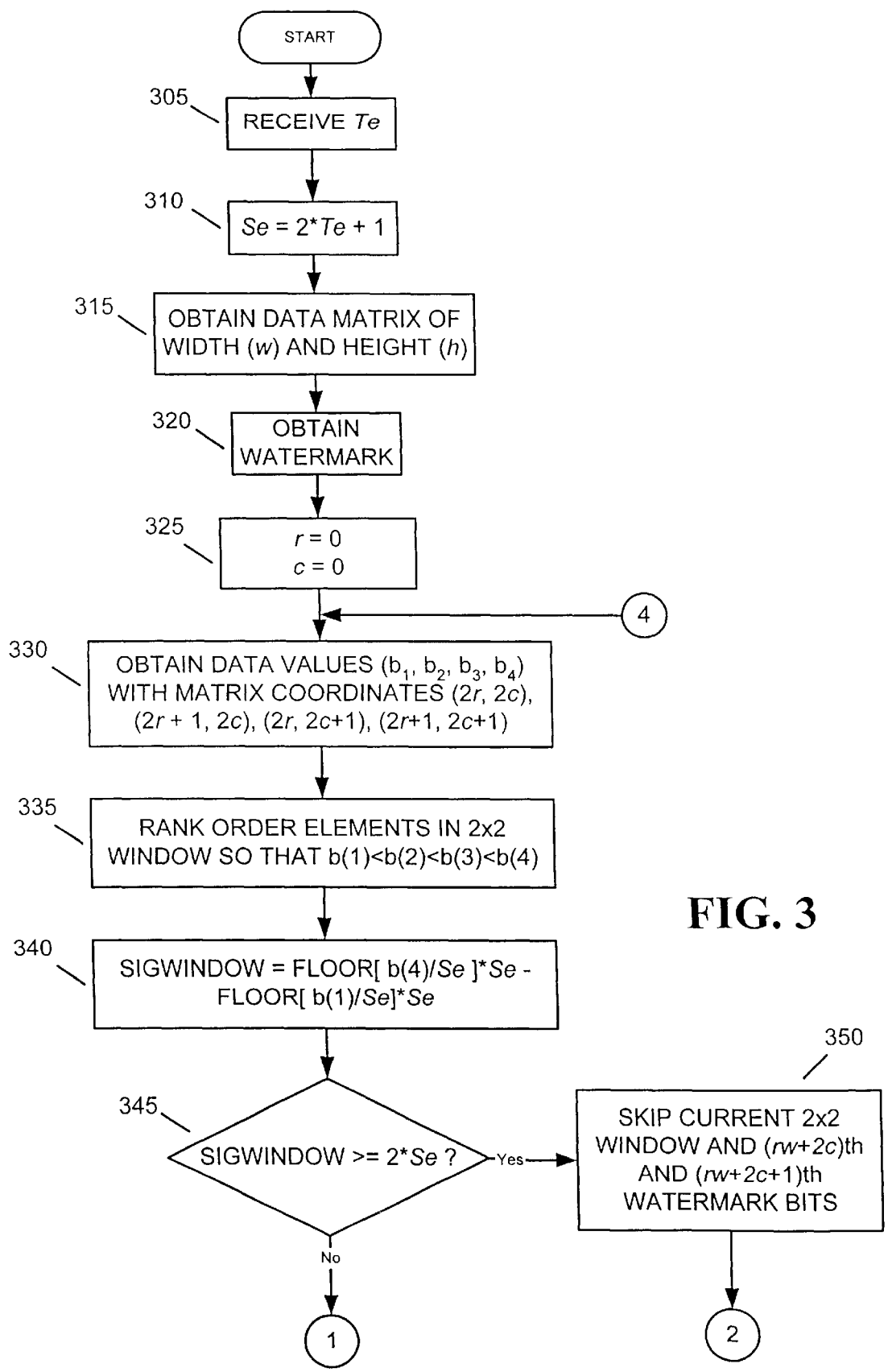
FIGS. 3–5 are flowcharts that illustrate exemplary system processing for etching a watermark in digital data consistent with the present invention.
Figure 4:
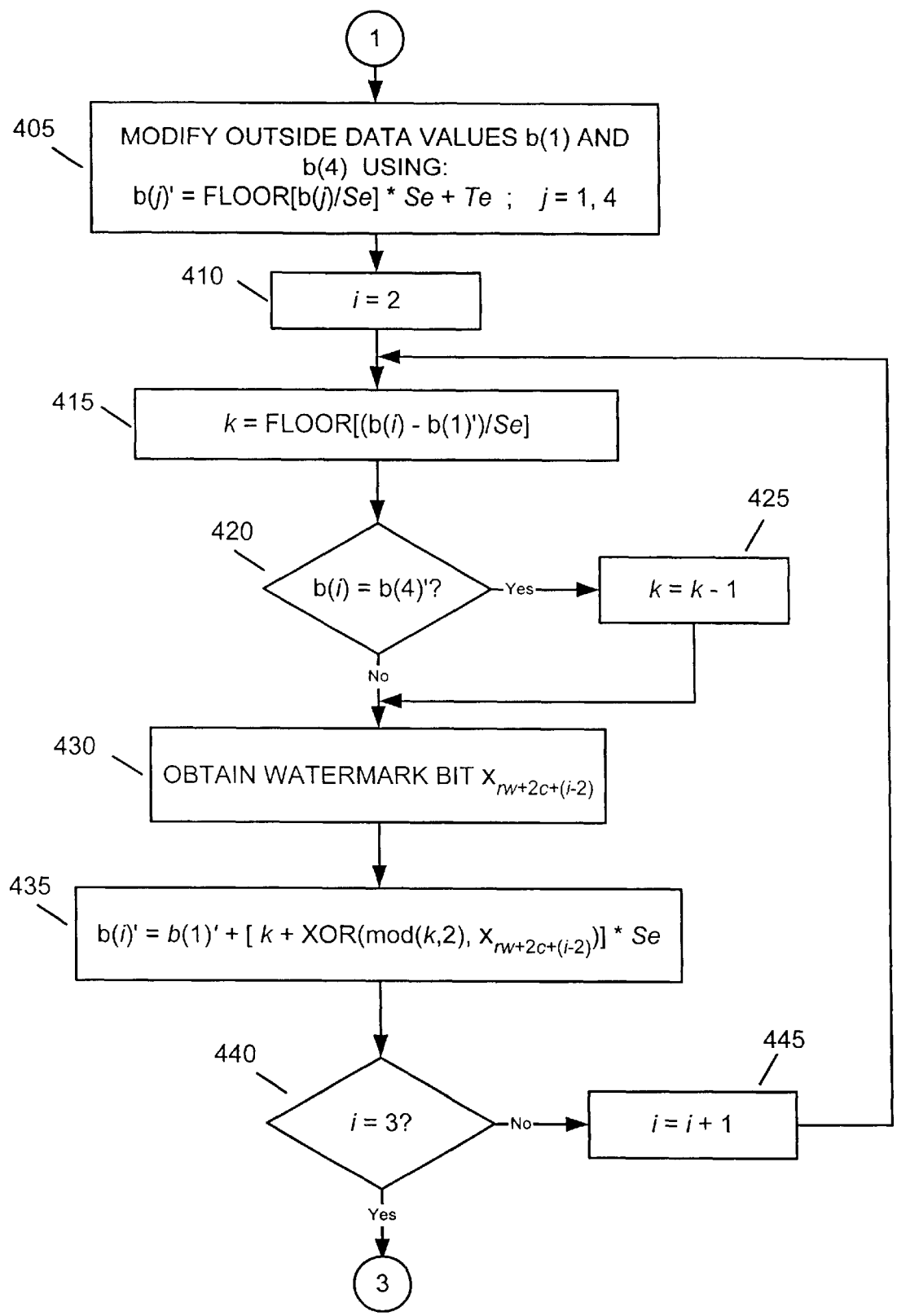
Figure 5:
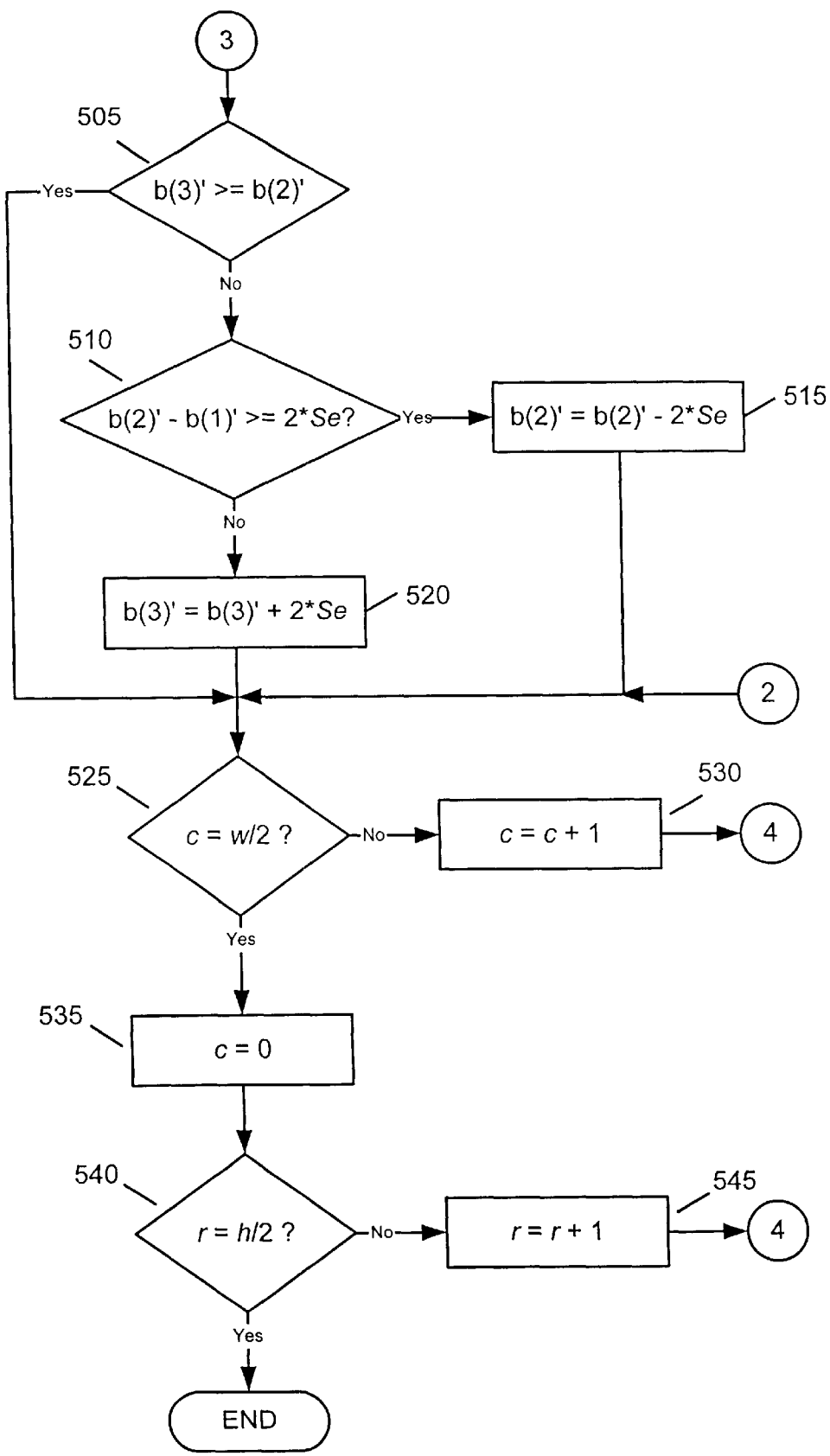

FIGS. 3–5 are flowcharts that illustrate exemplary processing, consistent with the present invention, for etching digital watermarks in a matrix of digital data. As one skilled in the art will appreciate, the method exemplified by FIGS. 3–5 can be implemented as a sequence of instructions and stored in ROM 230 of device 140 for execution by processor 220.

To begin the watermark etching processing, device 140 receives a tuning parameter Te that specifies the amount of acceptable distortion that the data of the etched data matrix may undergo (e.g., due to excessive recompression or tampering) before the watermark is destroyed [step 305]. Device 140 may receive tuning parameter Te via input device 215. Though various values of Te may be specified, a Te of 16 is one example of an acceptable value consistent with the present invention. Device 140 calculates an interval parameter Se [step 310], used for etching a watermark, according to the following equation:

$$Se=2*Te+1 \qquad \text{Eqn. (1)}$$

Figure 6:
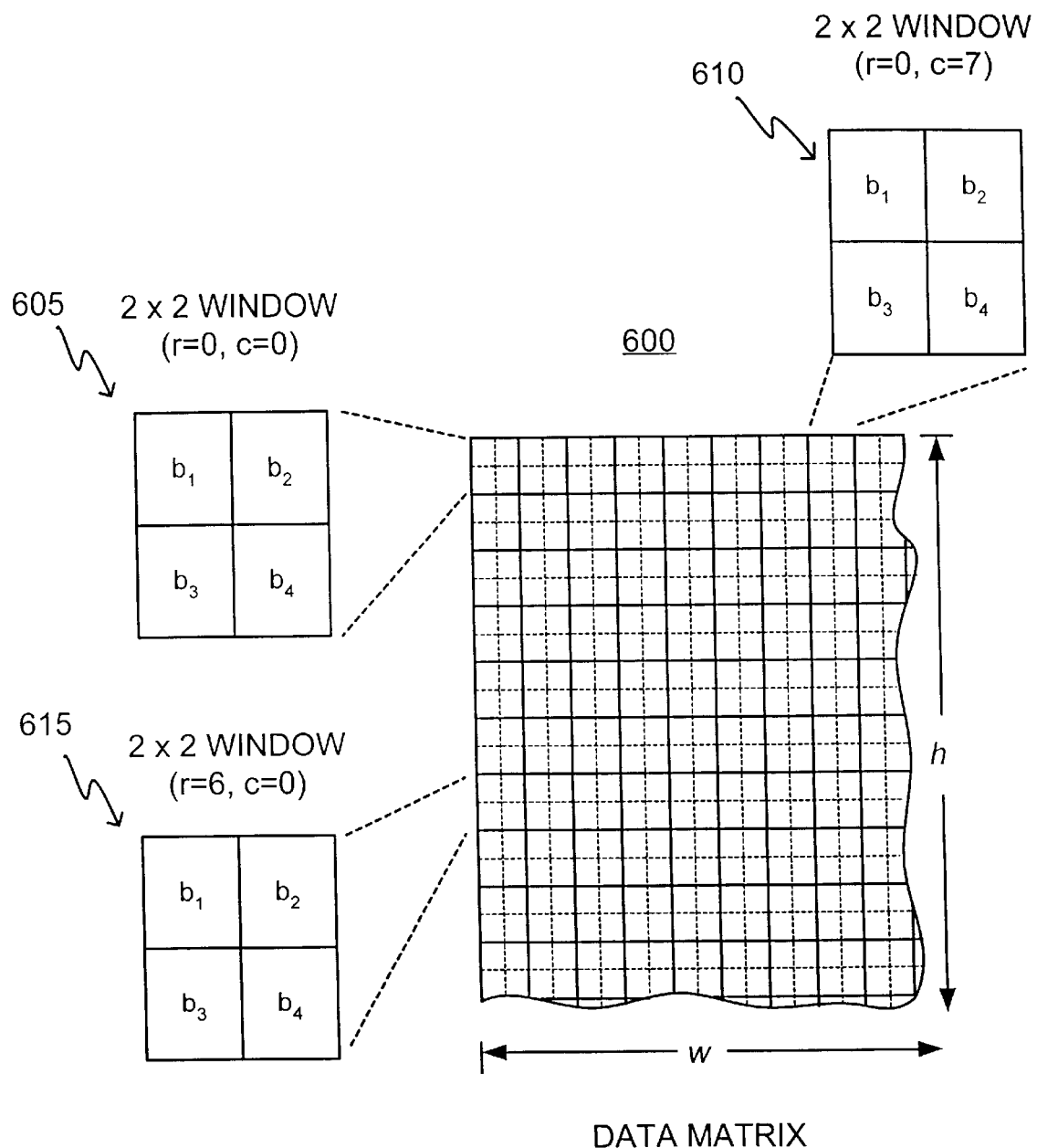
FIG. 6 illustrates an exemplary data matrix consistent with the present invention.

Device 140 obtains a matrix of digital data of width (w) and height (h) into which the watermark will be etched [step 315]. An example of one such matrix is a matrix of luminance DC coefficients of a conventional MPEG I-frame. An exemplary data matrix 600 that can be obtained by device 140 is illustrated in FIG. 6. Data matrix 600 can comprise a plurality of 2×2 windows 605, 610, and 615, each including data values $b_1$, $b_2$, $b_3$, $b_4$. Device 140 then obtains a watermark that includes a binary sequence of bits of length (w*h)/2 [step 320] (FIG. 3). The watermark can be derived using any conventional digital watermark production technique.

Device 140 sets matrix displacement parameters r and c, which specify rows and columns of 2×2 windows in the data matrix, to a value of zero [step 325]. Device 140 obtains data values of the matrix ($b_1$, $b_2$, $b_3$, $b_4$) by sliding a non-overlapping 2×2 window over the coordinates (2r, 2c), (2r+1, 2c), (2r, 2c+1), and (2r+1, 2c+1) of the matrix, where $0 \leq r \leq h/2$ and $0 \leq c \leq w/2$ [step 330]. For example, if data matrix 600 includes an MPEG I-frame, then device 140 can obtain the DC coefficients associated with each of the matrix coordinates of the 2×2 window.

Device 140 then orders the data values in the 2×2 window in rank order such that b(1)<b(2)<b(3)<b(4) [step 335]. For example, if $b_1$=2016, $b_2$=127, $b_3$=683 and $b_4$=480, then b(1) is set equal to $b_2$, b(2) is set equal to $b_4$, b(3) is set equal to $b_3$, and b(4) is set equal to $b_1$. Thus, in this example, b(1)<b(2)<b(3)<b(4).

Device 140 determines the significance (SIGWINDOW) of the current 2×2 window [step 340] using the following equation:

$$\text{SIGWINDOW}=\text{FLOOR}[b(4)/Se]*Se-\text{FLOOR}[b(1)/Se]*Se \qquad \text{Eqn. (2)}$$

where the function, FLOOR of [x], determines the largest integer less than or equal to x.
The significance of the current window indicates whether the region of data matrix 600, represented by the 2×2 window, is too smooth to hide watermark bits. Device 140 determines if the SIGWINDOW parameter is greater than, or equal to, two times the interval parameter Se [step 345]. If so, the current 2×2 window is too smooth to hide watermark bits and, thus, device 140 skips the 2×2 window and the (rw+2c)th and (rw+2c+1)th watermark bits [step 350]. Device 140 then proceeds to step 525 (see below). If SIGWINDOW is less than 2 times Se, device 140 modifies the data values b(1) and b(4) so that they each lie in the middle of the previously specified interval Se [step 405] (FIG. 4). To perform this modification, device 140 uses the following equation:

$$b(j)'=\text{floor}[b(j)/Se]*Se+Te; \; j=1,4 \qquad \text{Eqn. (3)}$$

Device 140 sets counter value i to 2 [step 410]. Device 140 then, using the counter value i, determines a value k [step 415] according to the following equation:

$$k=\text{FLOOR}[(b(i)-b(1)')/Se] \qquad \text{Eqn. (4)}$$

Device 140 determines if b(i) is equal to b(4)' [step 420]. If so, device 140 decrements k by 1 [step 425]. If not, device 140 obtains the (rw+2c+(i−2))th watermark bit $x_{rw+2c+(i-2)}$ [step 430]. Device 140 transforms the data value b(i) [step 435] using the following equation:

$$b(i)'=b(1)'+[k+XOR(\text{mod}(k,2), x_{rw+2c+(i-2)})]*Se \qquad \text{Eqn. (5)}$$

Device 140 then determines if the counter value i is equal to three, indicating that both b(2) and b(3) have been modified by Eqn. (5) [step 440]. If not, device 140 increments i by 1 [step 445] and returns to step 415 to modify b(3).

If device 140 determines that the counter value i is equal to three, device 140 may correct the modified data values b(2)' and b(3)' to ensure the correct rank order. To do so, device 140 determines if b(3)' is greater than, or equal to, b(2)' [step 505]. If b(3)' is greater than, or equal to, b(2)', correction of the data values b(2)' and b(3)' is not required and processing proceeds to step 525 below. If b(3)' is less than b(2)', device 140 determines if b(1)' subtracted from b(2)' is greater than, or equal to, two times the interval parameter Se [step 510]. If so, 2 times Se is subtracted from b(2)' [step 515]. If b(1)' subtracted from b(2)' is less than two times Se, then two times Se is added to b(3)' [step 520].

At step 525, device 140 determines if the sliding 2×2 window has reached the last 2×2 column of the data matrix. To achieve this, device 140 determines if column parameter c is equal to w/2 [step 525]. If not, device 140 increments the column parameter c by 1 [step 530] and returns to step 325 (FIG. 3). If c is equal to w/2, device 140 resets c to a value of zero [step 535] and determines if the row parameter r is equal to h/2 [step 540]. If not, device 140 increments r by 1 [step 545] and returns to step 325 (FIG. 3). If r is equal to h/2, then processing completes.

Exemplary Watermark Extraction Processing

Figure 7:
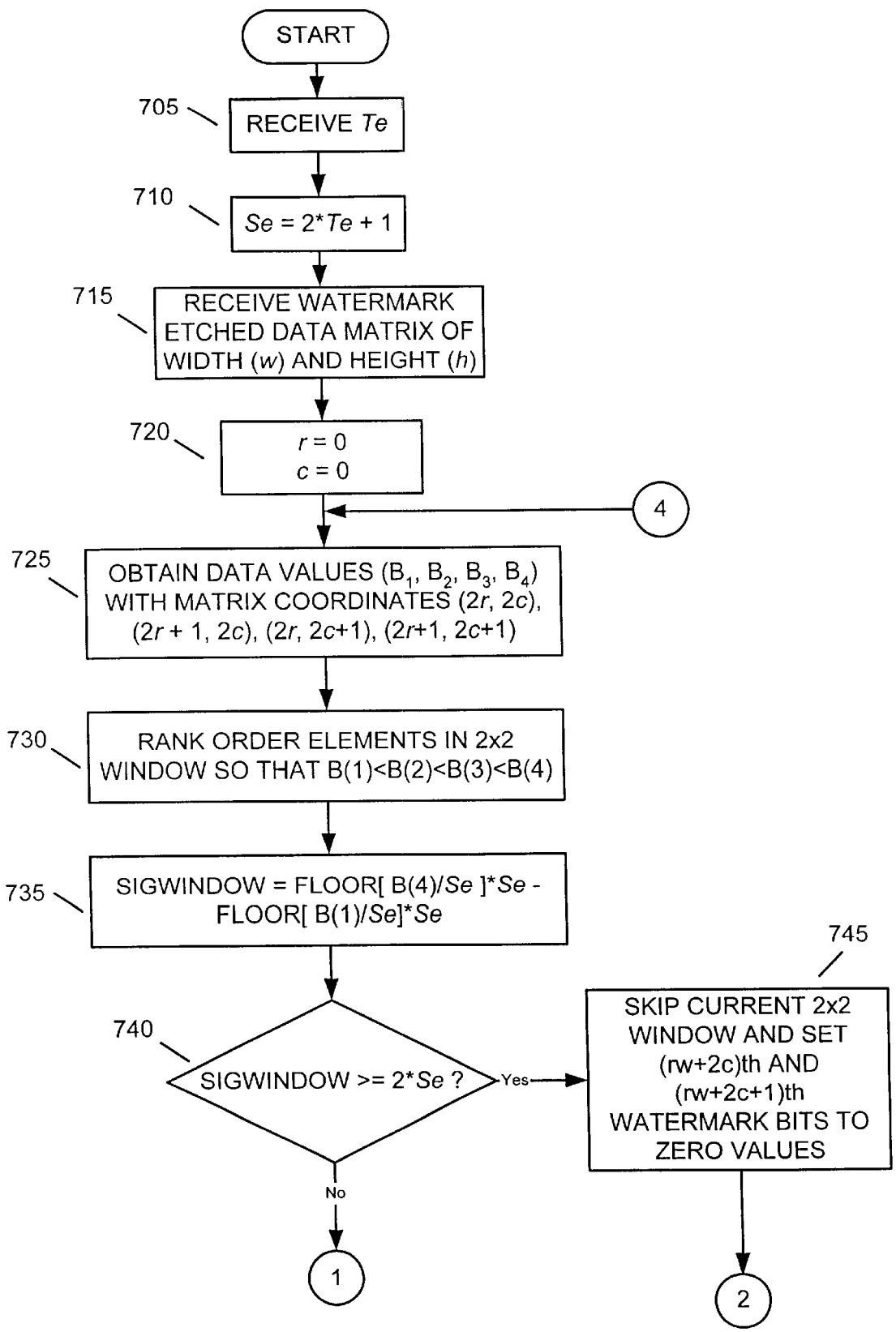
FIGS. 7–9 are flowcharts that illustrate exemplary system processing for extracting a watermark consistent with the present invention.
Figure 8:
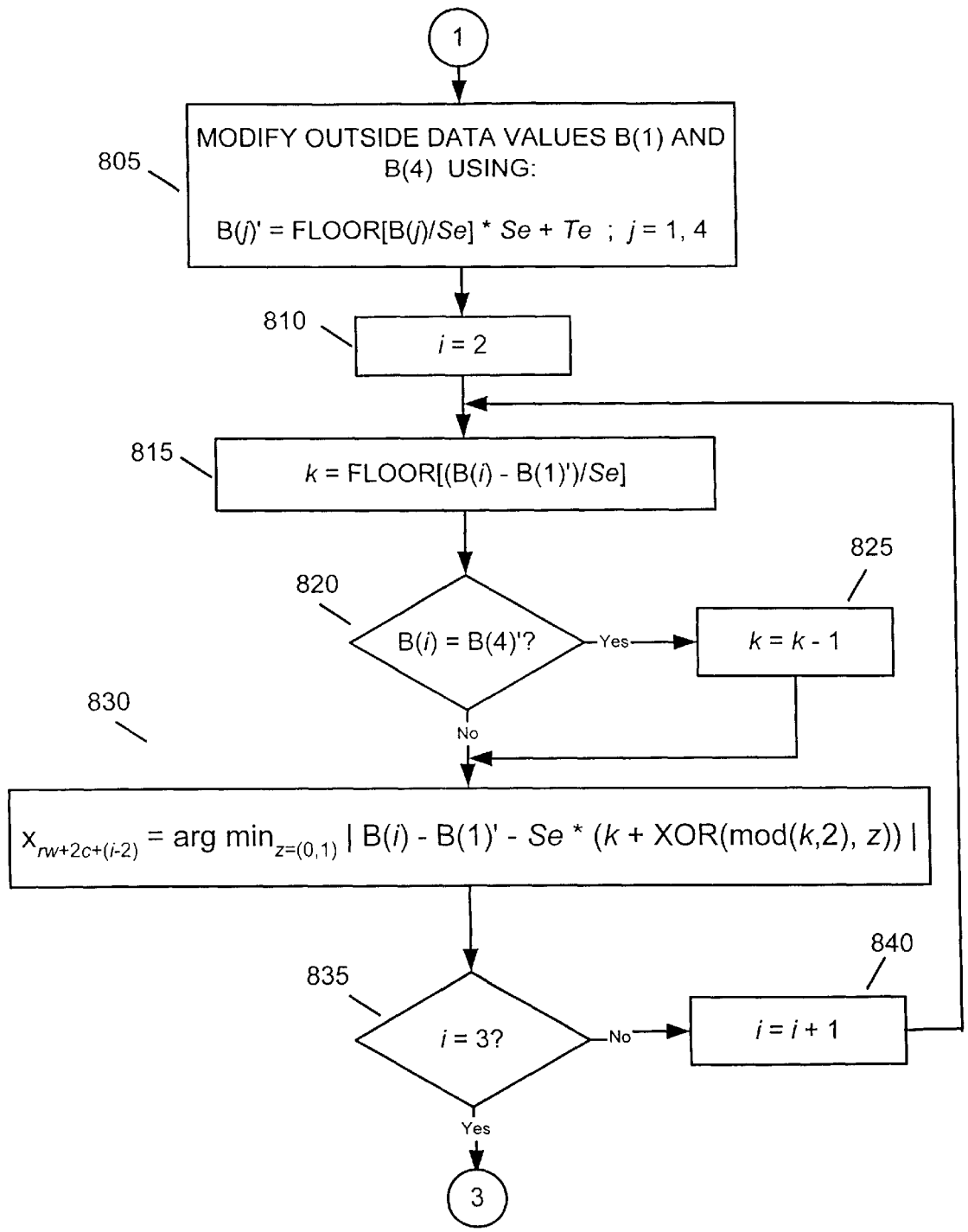
Figure 9:
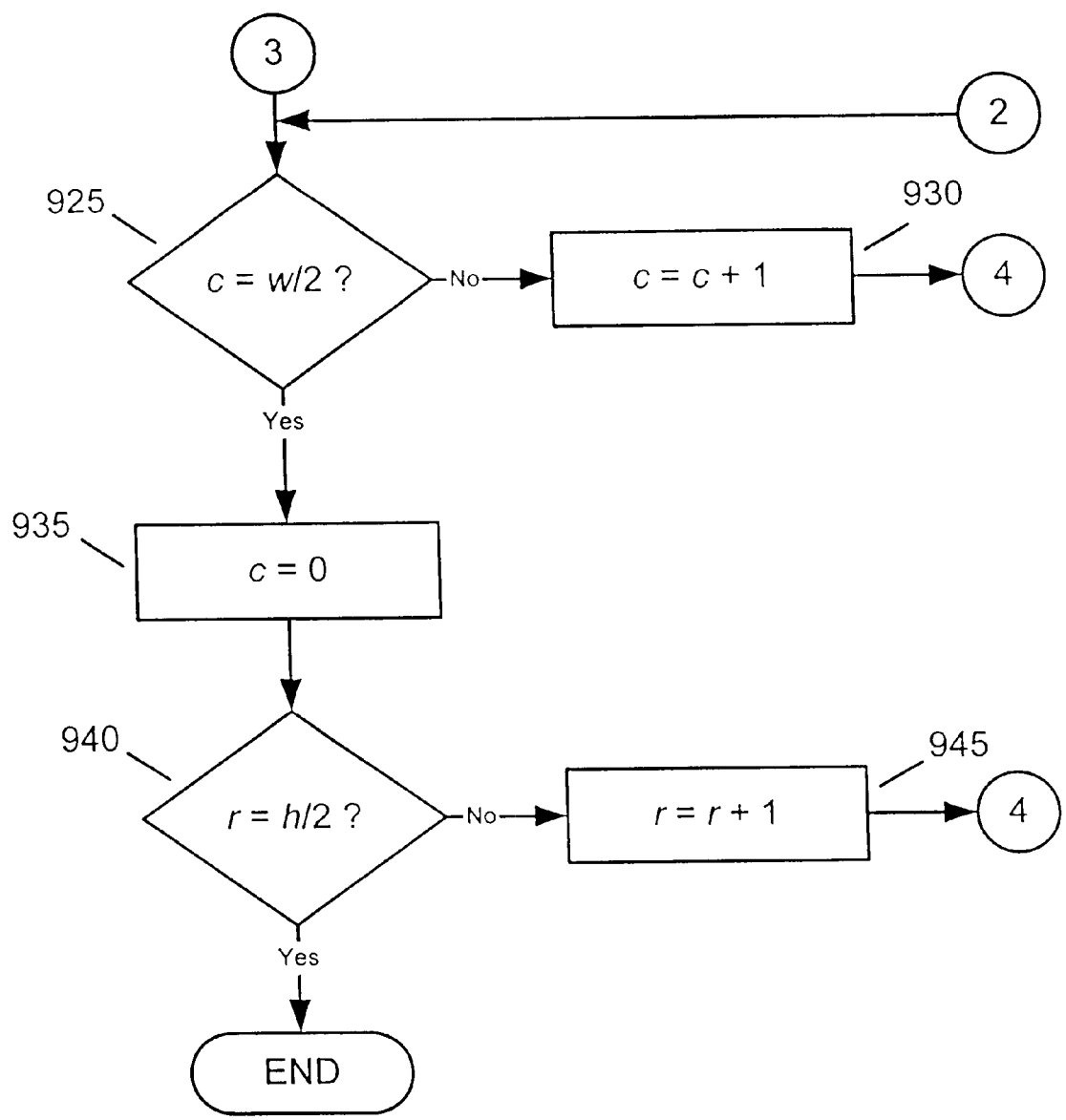

FIGS. 7–9 are flowcharts that illustrate exemplary processing, consistent with the present invention, for extracting digital watermarks from, for example, video data. As one skilled in the art will appreciate, the method exemplified by FIGS. 7–9 can be implemented as a sequence of instructions and stored in ROM 230 of device 170 for execution by processor 220.

To begin watermark extraction processing, device 170 receives a tuning parameter Te that specifies the amount of acceptable distortion that the data of the etched data matrix may undergo (e.g., due to excessive recompression or tampering) before the watermark is destroyed [step 705]. Device 170 may receive tuning parameter Te via input device 215. Though various values of Te may be specified, a Te of 16 is one example of an acceptable value consistent with the present invention. Device 170 calculates an interval parameter Se [step 710], used for extracting the watermark, according to the following equation:

$$Se = 2*Te + 1 \qquad \text{Eqn. (6)}$$

Device 170 receives a matrix of watermark etched digital data of width (w) and height h) [step 715]. An example of one such matrix is a matrix of conventional luminance DC coefficients of an MPEG I-frame that contains a watermark etched in accordance with the present invention.

Device 170 sets matrix displacement parameters r and c, which specify rows and columns of 2×2 windows in the watermark etched data matrix, to a value of zero [step 720]. Device 170 obtains data values of the matrix $(B_1, B_2, B_3, B_4)$ by sliding a non-overlapping 2×2 window over the coordinates (2r, 2c), (2r+1, 2c), (2r, 2c+1), and (2r+1, 2c+1) of the etched matrix, where $0 \leq r \leq h/2$ and $0 \leq c \leq w/2$ [step 725]. For example, if the etched data matrix includes an MPEG I-frame, then device 170 can obtain the DC coefficients associated with each of the matrix coordinates of the 2×2 window.

Device 170 then orders the data values in the 2×2 window in rank order such that B(1)<B(2)<B(3)<B(4) [step 730]. For example, if $B_1=2000$, $B_2=100$, $B_3=650$ and $B_4=450$, then B(1) is set equal to $B_2$, B(2) is set equal to $B_4$, B(3) is set equal to $B_3$, and B(4) is set equal to $B_1$. Thus, in this example, B(1)<B(2)<B(3)<B(4).

Device 170 determines the significance (SIGWINDOW) of the current 2×2 window [step 735] using the following equation:

$$\text{SIGWINDOW} = \text{FLOOR}[B(4)/Se]*Se - \text{FLOOR}[B(1)/Se]*Se \qquad \text{Eqn. (7)}$$

where the function, FLOOR of [x], determines the largest integer less than or equal to x.

The significance of the current window indicates whether the region of the data matrix, represented by the 2×2 window, is too smooth to contain watermark bits. Device 170 determines if the SIGWINDOW parameter is greater than, or equal to, two times the interval parameter Se [step 740]. If so, the current 2×2 window is too smooth to contain watermark bits and, thus, device 170 skips the window and sets the (rw+2c)th and (rw+2c+1)th watermark bits to zero values [step 745]. Device 170 then proceeds to step 925 (see below). If SIGWINDOW is less than 2 times Se, device 170 modifies the data values B(1) and B(4) so that they each lie in the middle of the previously specified interval Se [step 805] (FIG. 8). To perform this modification, device 170 uses the following equation:

$$B(j)' = \text{floor}[B(j)/Se]*Se + Te; \ j=1,4 \qquad \text{Eqn. (8)}$$

Device 170 sets counter value i to 2 [step 810]. Device 170 then, using the counter value i, determines a value k [step 815] according to the following equation:

$$k = \text{FLOOR}[(B(i) - B(1)')/Se \qquad \text{Eqn. (9)}$$

Device 170 determines if B(i) is equal to B(4)' [step 820]. If so, device 170 decrements k by 1[step 825]. If not, device 170 extracts the rw+2c+(i-2)th watermark bit $x_{rw+2c+(i-2)}$ [step 830] from B(i) using the following equation:

$$x_{rw+2c+(i-2)} = \arg\min_{z=(0,1)}|B(i) - B(1)' - Se*(k + \text{XOR}(\text{mod}(k,2),z))| \qquad \text{Eqn. (10)}$$

Device 170 then determines if the counter value i is equal to three, indicating that both watermark bits etched in B(2) and B(3) have been extracted [step 835]. If not, device 170 increments i by 1 [step 840] and returns to step 815 to extract the next watermark bit.

If device 170 determines that the counter value i is equal to three, device 170 then determines if the sliding 2×2 window has reached the last 2×2 column of the data matrix. To achieve this, device 170 determines if column parameter c is equal to w/2 [step 925] (FIG. 9). If not, device 170 increments the column parameter c by 1 [step 930] and returns to step 725 (FIG. 7). If c is equal to w/2, device 170 resets c to a value of zero [step 935] and determines if the row parameter r is equal to h/2 [step 940]. If not, device 170 increments r by 1 [step 945] and returns to step 725 (FIG. 7). If r is equal to h/2, processing completes.

Conclusion

Systems and methods consistent with the present invention provide mechanisms that improve the error tolerance of watermark etching algorithms. The present invention makes the watermark etching process more robust to errors by building in an error tolerance buffer when watermark bits are etched into digital data. Thus, using systems and methods consistent with the present invention, minor modifications (e.g., distortions) to digital data values that fall within a specified error tolerance range will not cause errors in the watermark extraction process.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while certain components of the invention have been described as implemented in hardware and others in software, other configurations may be possible. Also, while series of steps have been described with regard to FIGS. 3–5 and 7–9, the order of the steps may be varied in other implementations consistent with the present invention. No element, step, or instruction used in the description of the present application should be construed as critical or essential to the invention unless explicitly described as such. The scope of the invention is defined by the following claims and their equivalents.

What is claimed is:

1. A method of watermarking digital data, comprising:
   obtaining a matrix of digital data values;
   selecting a plurality of data values from the matrix;

obtaining watermark bits;

specifying a watermark error tolerance parameter (Te); and etching the watermark bits in at least two of the plurality of data values to produce etched data values using the error tolerance parameter, wherein a function of the error tolerance parameter specifies a maximum amount of variation that the etched data values may incur before errors are introduced into the etched watermark bits.

2. The method of claim 1, further comprising:

ordering the plurality of data values in rank order to produce rank ordered data values.

3. The method of claim 2, the method further comprising:

modifying outer data values of the rank ordered data values using the error tolerance parameter.

4. The method of claim 2, wherein the function of the error tolerance parameter comprises:

$$Se=2*Te+1.$$

5. The method of claim 4, further comprising:

modifying the smallest (b(1)) and largest (b(n)) of the rank ordered data values to produce modified data values (b(j)') according to the relation:

$$b(j)'=FLOOR[b(j)/Se]*Se+Te;\ j=1,n.$$

where FLOOR of [b(j)/Se] determines a largest integer less than or equal to b(j)/Se.

6. The method of claim 5, further comprising:

etching watermark bits (x) into intermediate values (b(i)) of the rank ordered data values existing between the smallest (b(1)) and largest (b(n)) values according to the relation:

$$b(i)'=b(1)'+[k+XOR(\mod(k,2),x]*Se$$

where

1<i<n, and k=FLOOR[(b(i)−b(1)')/Se].

7. The method of claim 1, wherein the matrix comprises video data.

8. The method of claim 1, wherein the data values comprise coefficients of a frame of video data.

9. The method of claim 8, wherein the coefficients comprise DC coefficients.

10. The method of claim 8, wherein the frame of video data comprises an MPEG I-frame.

11. The method of claim 1, wherein the plurality of data values comprise a 2×2 window of data values.

12. A computer-readable medium containing instructions for controlling at least one processor to perform a method of watermarking digital data, the method comprising:

obtaining a matrix of digital data values;

selecting a plurality of data values from the matrix;

obtaining watermark bits;

specifying a watermark error tolerance parameter; and etching the watermark bits in at least two of the plurality of data values to produce etched data values using the error tolerance parameter, wherein a function of the error tolerance parameter specifies a maximum amount of variation that the etched data values may incur before errors are introduced into the etched watermark bits.

13. An apparatus for watermarking digital data, comprising:

an input device configured to receive a matrix of digital data values;

at least one processor configured to:

select a plurality of data values from the matrix;

obtain watermark bits;

specify a watermark error tolerance parameter; and etch the watermark bits in at least two of the plurality of data values to produce etched data values using the error tolerance parameter, wherein a function of the error tolerance parameter specifies a maximum amount of variation that the etched data values may incur before errors are introduced into the etched watermark bits.

14. A system for etching digital watermarks, comprising:

means for obtaining a matrix of digital data values;

means for selecting a plurality of data values from the matrix;

means for obtaining watermark bits;

means for specifying a watermark error tolerance parameter; and means for etching the watermark bits in at least two of the plurality of data values to produce etched data values using the error tolerance parameter, wherein a function of the error tolerance parameter specifies a maximum amount of variation that the etched data values may incur before errors are introduced into the etched watermark bits.

15. A method of watermarking data, comprising:

obtaining a plurality of data values;

obtaining watermark data; and etching the watermark data into at least one of the plurality of data values to produce etched data values, wherein etching the watermark further comprises:

introducing an error tolerance buffer that determines an amount that the etched data values may be modified before the watermark data is destroyed.

16. The method of claim 15, wherein introducing the error tolerance buffer comprises: ordering the plurality of data values in rank order to produce rank ordered data values.

17. The method of claim 16, wherein introducing an error tolerance buffer further comprises:

specifying an error tolerance parameter (Te).

18. The method of claim 17, wherein introducing the error tolerance buffer further comprises:

modifying outer data values of the rank ordered data values using the error tolerance parameter.

19. The method of claim 17, wherein introducing the error tolerance buffer further comprises:

modifying the smallest (b(1)) and largest (b(n)) of the rank ordered data values to produce modified values (b(j)') according to the relation:

$$b(j)'=FLOOR[b(j)/Se]*Se+Te;\ j=1,n.$$

wherein FLOOR of [y], determines a largest integer less than or equal to y, and $$Se=2*Te+1.$$

20. The method of claim 19, wherein etching the watermark data comprises:

etching watermark data (x) into intermediate values (b(i)) of the rank ordered data values existing between the smallest (b(1)) and largest (b(n)) values according to the relation:

$$b(i)'=b(1)'+[k+XOR(\mod(k,2),x]*Se$$

where
1<i<n, and
k=FLOOR[(b(i)−b(1)')/Se].

21. A computer-readable medium containing instructions for controlling at least one processor to perform a method of watermarking data, the method comprising:
    obtaining a plurality of data values;
    obtaining watermark data; and
    etching the watermark data into at least one of the plurality of data values to produce etched data values, wherein etching the watermark further comprises:
        introducing an error tolerance buffer that determines an amount that the etched data values may be modified before the watermark data is destroyed.

22. An apparatus for watermarking digital data, comprising:
    at least one input device configured to:
        receive a plurality of data values, and
        receive watermark data; and
    at least one processor configured to:
        etch the watermark data into at least one of the plurality of data values to produce etched data values, wherein etching the watermark further comprises:
            introducing an error tolerance buffer that determines an amount the etched data values may be modified before the watermark data is destroyed.

23. A method of watermarking data, comprising:
    obtaining a matrix of data;
    obtaining watermark data;
    determining whether a region of the data matrix cannot hide watermark data; and
    selectively etching watermark data into the region of the data matrix, based on the determination, to produced etched data,
        wherein determining whether a region of the data matrix cannot hide watermark data comprises:
            determining a significance parameter (SIGWINDOW) indicating a significance of the region of the data matrix;
            comparing the significance parameter to a function of an error tolerance parameter (Te) that specifies a maximum amount of variation that the etched data may incur before errors are introduced into the etched watermark data; and
            designating the region of the data matrix as unable to hide watermark data based on the comparison.

24. The method of claim 23, wherein the significance parameter (SIGWINDOW) comprises:

$$SIGWINDOW = FLOOR[b_1/Se]*Se - FLOOR[b_2/Se]*Se$$

where
    FLOOR of [x] determines a largest integer less than or equal to x,
    $b_1$ comprises a first data value from the region of the data matrix,
    $b_2$ comprises a second data value from the region of the data matrix, and
    Se comprises a function of Te.

25. The method of claim 24, wherein Se comprises 2*Te+1.

26. The method of claim 24, wherein $b_1$ comprises a largest data value of the region of the data matrix.

27. The method of claim 24, wherein $b_2$ comprises a smallest data value of the region of the data matrix.

28. The method of claim 23, wherein the function of the error tolerance parameter (Te) comprises 2*Se, where Se=2*Te+1.

29. The method of claim 23, wherein comparing the significance parameter (SIGWINDOW) to a function of an error tolerance parameter (Te) comprises:
    determining if SIGWINDOW is greater than, or equal to, 2*Se, where Se=2*Te+1.

30. A computer-readable medium containing instructions for controlling at least one processor to perform a method of watermarking data, the method comprising:
    obtaining a matrix of data;
    obtaining watermark data;
    determining whether a region of the data matrix is too smooth to hide watermark data; and
    selectively etching watermark data into the region of the data matrix, based on the determination, to produced etched data,
        wherein determining whether a region of the data matrix is too smooth to hide watermark data comprises:
            determining a significance parameter (SIGWINDOW) indicating a significance of the region of the data matrix;
            comparing the significance parameter to a function of an error tolerance parameter (Te) that specifies a maximum amount of variation that the etched data may incur before errors are introduced into the etched watermark data; and
            designating the region of the data matrix as too smooth to hide watermark data based on the comparison.

31. An apparatus for watermarking digital data, comprising:
    at least one input device configured to:
        receive a matrix of data, and
        receive watermark data;
    at least one processor configured to:
        determine whether a region of the data matrix is too smooth to hide watermark data, wherein determining whether a region of the data matrix is too smooth to hide watermark data comprises:
            determining a significance parameter (SIGWINDOW) indicating a significance of the region of the data matrix;
            comparing the significance parameter to a function of an error tolerance parameter (Te) that specifies a maximum amount of variation that the etched data may incur before errors are introduced into the etched watermark data; and
            designating the region of the data matrix as too smooth to hide watermark data based on the comparison; and
        selectively etch watermark data into the region of the data matrix, based on the determination, to produced etched data.

32. A method of extracting watermark bits from digital data, comprising:
    obtaining a matrix of digital data values;
    selecting a plurality of data values from the matrix, at least one of the plurality of data values being etched with watermark bits;
    specifying a watermark error tolerance parameter (Te); and
    extracting the watermark bits from the at least one of the plurality of data values using the error tolerance parameter, wherein a function of the error tolerance parameter specifies a maximum amount of variation that the etched plurality of data values may have incurred, prior to extraction, before errors were introduced into the watermark bits.

33. The method of claim 32, further comprising:

ordering the plurality of data values in rank order to produce rank ordered data values.

34. The method of claim 33, the method further comprising:

modifying outer data values of the rank ordered data values using the error tolerance parameter.

35. The method of claim 33, wherein the function of the error tolerance parameter comprises:

$$Se=2*Te+1.$$

36. The method of claim 35, further comprising:

modifying the smallest (B(1)) and largest (B(n)) of the rank ordered data values to produce modified data values (B(j)') according to the relation:

$$B(j)'=FLOOR[B(j)/Se]*Se+Te;\ j=1,n,$$

where FLOOR of [B(j)/Se] determines a largest integer less than or equal to B(j)/Se.

37. The method of claim 36, further comprising:

extracting the watermark bits (x) from intermediate values (B(i)) of the plurality of data values existing between the smallest (B(1)) and largest (B(n)) values according to the relation:

$$x=arg\ min_{z=(0,1)}|B(i)-B(1)'-Se*(k+XOR(mod(k,2),z))|$$

where
1<i<n, and
k=FLOOR[(B(i)−B(1)')/Se].

38. The method of claim 32, wherein the matrix comprises video data.

39. The method of claim 32, wherein the data values comprise coefficients of a frame of video data.

40. The method of claim 39, wherein the coefficients comprise DC coefficients.

41. The method of claim 39, wherein the frame of video data comprises an MPEG I-frame.

42. The method of claim 32, wherein the plurality of data values comprise a 2×2 window of data values.

43. A computer-readable medium containing instructions for controlling at least one processor to perform a method of extracting watermark bits from digital data, the method comprising:

obtaining a matrix of digital data values;

selecting a plurality of data values from the matrix, at least one of the plurality of data values being etched with watermark bits;

specifying a watermark error tolerance parameter; and extracting the watermark bits from the at least one of the plurality of data values using the error tolerance parameter, wherein a function of the error tolerance parameter specifies a maximum amount of variation that the etched plurality of data values may have incurred, prior to extraction, before errors were introduced into the watermark bits.

44. An apparatus extracting watermark bits from digital data, comprising:

at least one input device configured to:
receive a matrix of digital data values; and at least one processor configured to:
select a plurality of data values from the matrix, at least one of the plurality of data values being etched with watermark bits,
specify a watermark error tolerance parameter, and
extract the watermark bits from the at least one of the plurality of data values using the error tolerance parameter,
wherein a function of the error tolerance parameter specifies a maximum amount of variation that the etched data values may have incurred, prior to extraction, before errors were introduced into the watermark bits.

45. A method of extracting a watermark from data, comprising:

obtaining a plurality of data values etched with watermark data; and extracting the watermark data from the plurality of data values in accordance with an error tolerance buffer built into the etched data, wherein the error tolerance buffer specifies an amount that the etched data may have been modified, prior to extraction, before destruction of the watermark data.

46. The method of claim 45, further comprising:

ordering the plurality of data values in rank order to produce rank ordered data values.

47. The method of claim 46, wherein extracting the watermark data comprises:

specifying an error tolerance parameter (Te).

48. The method of claim 47, wherein extracting the watermark data further comprises:

modifying the smallest (B(1)) and largest (B(n)) of the rank ordered data values to produce modified values (B(j)') according to the relation:

$$B(j)'=FLOOR[B(j)/Se]*Se+Te;\ j=1,n.$$

wherein FLOOR of [B(j)/Se], determines a largest integer less than or equal to B(j)/Se, and $$Se=2*Te+1.$$

49. The method of claim 48, wherein extracting the watermark data further comprises:

extracting watermark data (x) from intermediate values (B(i)) of the rank ordered data values existing between the smallest (B(1)) and largest (B(n)) values according to the relation:

$$x=arg\ min_{z=(0,1)}|B(i)-B(1)'-Se*(k+XOR(mod(k,2),z))|$$

where
1<i<n, and
k=FLOOR[(B(i)−B(1)')/Se].

50. The method of claim 46, wherein extracting the watermark data further comprises:

modifying outer data values of the rank ordered data values using the error tolerance parameter to produce rank ordered data values.

51. A computer-readable medium containing instructions for controlling at least one processor to perform a method of extracting a watermark from data, the method comprising:

obtaining a plurality of data values etched with watermark data; and extracting the watermark data from the plurality of data values in accordance with an error tolerance buffer built into the etched data, wherein the error tolerance buffer specifies an amount that the etched data may have been modified, prior to extraction, before destruction of the watermark data.

52. An apparatus for extracting a watermark from data, comprising:

at least one input device configured to:
receive a plurality of data values etched with watermark data; and at least one processor configured to:
extract the watermark data from the plurality of data values in accordance with an error tolerance buffer built into the etched data, wherein the error tolerance buffer specifies an amount that the etched data may have been modified, prior to extraction, before destruction of the watermark data.

53. A method of extracting a watermark from data, comprising:

obtaining a matrix of data etched with watermark data;

determining whether a region of the data matrix cannot hide watermark data; and selectively extracting watermark data from the region of the data matrix based on the determination, wherein determining whether a region of the data matrix cannot hide watermark data further comprises:

determining a significance parameter (SIGWINDOW) indicating a significance of the region of the data matrix;

comparing the significance parameter to a function of an error tolerance parameter (Te) that specifies a maximum amount of variation the etched data may incur before errors are introduced into the etched watermark data; and designating the region of the data matrix as unable to hide watermark data based on the comparison.

54. The method of claim 53, wherein the significance parameter (SIGWINDOW) comprises:

$$SIGWINDOW=FLOOR[b_1/Se]*Se-FLOOR[b_2/Se]*Se$$

where

FLOOR of [x] determines a largest integer less than or equal to x, $b_1$ comprises a first data value from the region of the data matrix, $b_2$ comprises a second data value from the region of the data matrix, and Se comprises a function of Te.

55. The method of claim 54, wherein Se comprises 2*Te+1.

56. The method of claim 54, wherein $b_1$ comprises a largest data value of the region of the data matrix.

57. The method of claim 54, wherein $b_2$ comprises a smallest data value of the region of the data matrix.

58. The method of claim 53, wherein the function of the error tolerance parameter (Te) comprises 2*Se, where Se=2*Te+1.

59. The method of claim 53, wherein comparing the significance parameter (SIGWINDOW) to a function of an error tolerance parameter (Te) comprises:

determining if SIGWINDOW is greater than, or equal to, 2*Se, where Se=2*Te+1.

60. A computer-readable medium containing instructions for controlling at least one processor to perform a method of extracting a watermark from data, the method comprising:

obtaining a matrix of data etched with watermark data;

determining whether a region of the data matrix is too smooth to hide watermark data; and selectively extracting watermark data from the region of the data matrix based on the determination, wherein determining whether a region of the data matrix cannot hide watermark data further comprises:

determining a significance parameter (SIGWINDOW) indicating a significance of the region of the data matrix;

comparing the significance parameter to a function of an error tolerance parameter (Te) that specifies a maximum amount of variation the etched data may incur before errors are introduced into the etched watermark data; and designating the region of the data matrix as unable to hide watermark data based on the comparison.

61. An apparatus for extracting a watermark from data, comprising:

at least one input device configured to:
receive a matrix of data etched with watermark data;

at least one processor configured to:
determine whether a region of the data matrix is too smooth to hide watermark data, and selectively extract watermark data from the region of the data matrix based on the determination, wherein determining whether a region of the data matrix cannot hide watermark data further comprises:

determining a significance parameter (SIGWINDOW) indicating a significance of the region of the data matrix;

comparing the significance parameter to a function of an error tolerance parameter (Te) that specifies a maximum amount of variation the etched data may incur before errors are introduced into the etched watermark data; and designating the region of the data matrix as unable to hide watermark data based on the comparison.

* * * * *